United States Patent

Bösl et al.

[11] Patent Number: 6,131,714
[45] Date of Patent: Oct. 17, 2000

[54] AUXILIARY DRIVE FOR UTILITY VEHICLE AND METHOD OF OPERATION THEREOF

[75] Inventors: Theodor Bösl; Johann Wittman; Johann Reisch, all of Marktoberdorf, Germany

[73] Assignee: AGCO GmbH & Co, Germany

[21] Appl. No.: 09/295,832

[22] Filed: Apr. 21, 1999

[30] Foreign Application Priority Data

Apr. 21, 1998 [GB] United Kingdom ............... 9808289

[51] Int. Cl.⁷ .................................................. F16D 67/04
[52] U.S. Cl. .................. 192/18 A; 192/12 C; 192/70.19
[58] Field of Search ................... 192/18 A, 12 C, 192/70.19

[56] References Cited

U.S. PATENT DOCUMENTS

| | | | |
|---|---|---|---|
| 2,674,356 | 4/1954 | Eason .................................. | 192/18 A |
| 2,890,773 | 6/1959 | Martindell ........................... | 192/18 A |
| 3,000,478 | 9/1961 | Carter .................................. | 192/18 A |
| 3,698,524 | 10/1972 | Schubert .......................... | 74/15.63 X |
| 4,108,291 | 8/1978 | Zenker ............................. | 192/18 A X |
| 4,399,715 | 8/1983 | Dziuba et al. . | |
| 4,567,971 | 2/1986 | Hille et al. ....................... | 192/18 A X |
| 4,613,024 | 9/1986 | Irikura et al. ..................... | 192/18 A |
| 4,926,989 | 5/1990 | Bruntz ............................... | 192/18 A |

FOREIGN PATENT DOCUMENTS 2277358  10/1994  United Kingdom .

*Primary Examiner*—Rodney H. Bonck
*Attorney, Agent, or Firm*—MacMillan, Sobanski & Todd, LLC

[57] ABSTRACT

A power-take-off of a utility vehicle such as an agricultural tractor has a clutch (3) and a brake (18) to retain the output shaft against rotation when the clutch is disengaged. The invention provides a means of automatically disengaging the brake to permit rotation of the output shaft for the purpose of coupling an implement thereto. In one embodiment, the clutch and brake are engaged by fluid under pressure, and are disengaged by stopping the vehicle engine and thus allowing engine generated fluid pressure to decay.

17 Claims, 1 Drawing Sheet

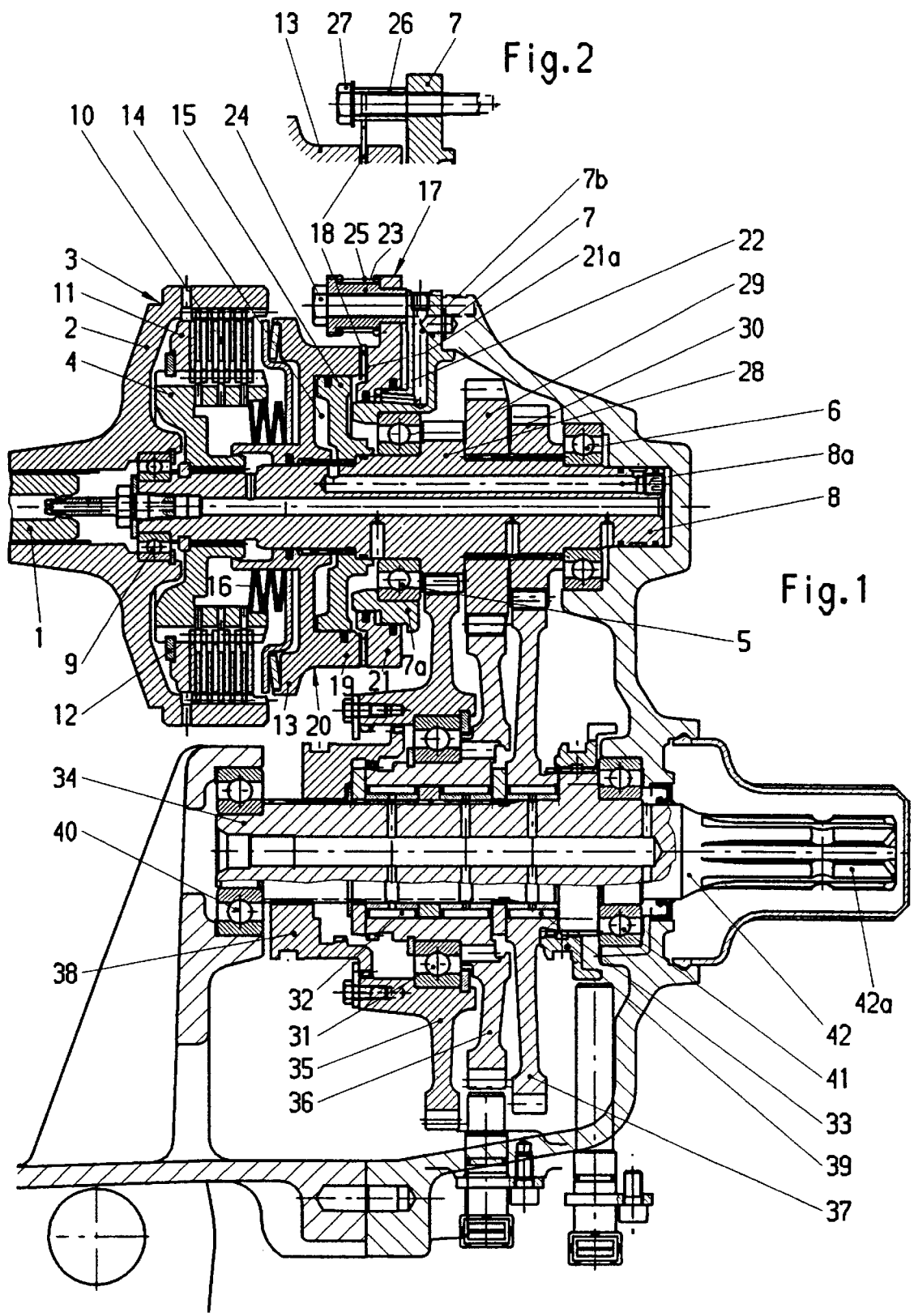

AUXILIARY DRIVE FOR UTILITY VEHICLE AND METHOD OF OPERATION THEREOF

BACKGROUND TO THE INVENTION

The invention relates to an auxiliary drive for utility vehicles having a hydraulic system, such as a drive for the power-take-off shaft of an agricultural tractor, having a friction clutch arranged in the power flow to the power-take-off shaft, and a braking device for the power-take-off shaft, in which the friction clutch and the braking device can be alternately engaged and released.

Used on agricultural tractors, auxiliary drives of this type are known and used as a "rear power-take-off" and "front power-take-off" and are described in U.S. Pat. No. 4,108,291 for example. They are used to drive various work tools used in conjunction with the vehicle and joined to them by means of an articulated shaft. Due to the fact that the available work tools operate at different nominal speeds, the auxiliary drive has a gear system with a corresponding number of gear speeds including a neutral gear, which can be shifted directly on the spot. If the auxiliary drive is not required, the "wet" friction clutch is generally disengaged. In order to prevent rotation of a power-take-off, which may be dangerous, the braking device engages, halting the power-take-off shaft. This being the case, the power-take-off shaft can assume a position in which the articulated shaft of a connecting work tool cannot be linked to the power-take-off shaft or can be so only with great difficulty, and possibly using a technique which is not safe.

One solution for making the power-take-off shaft rotate freely whilst the tool is being assembled is to shift the gear of the auxiliary drive into its neutral position. This solution has already been used in a manner whereby the changeover to neutral position is effected by an appropriate control device when the drive motor of the vehicle is switched off. The disadvantage of this solution, however is that users of such vehicles do not accept a situation in which a gear stage to be engaged after the tool has been assembled has to be shifted manually.

SUMMARY OF THE INVENTION

An objective of the invention is to provide an auxiliary drive which is not as inconvenient to the user in terms of operation.

According to the invention there is provided an auxiliary drive for a utility vehicle and having an input shaft, an output shaft, a clutch operable to connect the input and output shafts, a brake operable to hold the output shaft against rotation, and control means to control operation of said clutch and brake such that:

i) when the clutch is engaged, the brake is released ii) when the clutch is disengaged and the vehicle engine is running, the brake is engaged iii) when the clutch is disengaged and the vehicle engine is stopped, the brake is disengaged Such an arrangement ensures that the brake is released to permit the output shaft to be rotated for coupling with a work tool only in the case where it is safe to do so.

In one embodiment, both the clutch and brake are actuated by fluid under pressure from pump drives by the vehicle engine. The driver may cause the brake to be disengaged for coupling purposes simply by stopping the vehicle engine; this has the effect of stopping rotation of the input shaft, and disengaging both clutch and brake owing to lack of pump pressure. A suitable relief system, for example a restricted drain, can ensure that residual pressure is not maintained in the brake or clutch. As soon as the driver restarts the vehicle engine, the brake is automatically re-engaged as pressure becomes available.

Since both clutch and brake are preferably actuated by fluid under pressure it is possible to characterise the invention by the presence and absence of such pressure. In this way, the control means controls operation of a fluid operated clutch and brake such that:

i) when the clutch is engaged by fluid under pressure, the brake is released by the absence of fluid under pressure ii) when the clutch is disengaged by the absence of fluid under pressure, the brake is engaged by fluid under pressure iii) in the absence of fluid under pressure, both clutch and brake are disengaged Return springs may be provided for the clutch and brake where other means of releasing the clutch and brake are not provided; return springs are a simple and effective solution to preventing drag. A single return spring might be provided for both clutch and brake.

It is also possible to characterise the invention according to whether the input shaft is rotating. In this way, the control means controls operation of the clutch and brake such that:

i) when the clutch is engaged, the brake is released ii) when the clutch is disengaged and the input shaft is rotating, the brake is engaged iii) when the clutch is disengaged and the input shaft is stationary, the brake is disengaged In such a case, a rotation sensor of the input shaft can provide a logic input to the control means.

In the preferred embodiment the clutch includes an actuating member fixed for rotation with the output shaft and movable in a first direction to engage the clutch, and in the opposite direction to engage a brake member, and the brake includes control means to place the brake member in an active or inactive condition whereby the brake is rendered effective or ineffective.

Preferably the clutch is actuated by fluid under pressure, and the actuating member comprises a piston fixed for rotation with the output shaft but movable axially thereof, one side of the piston constituting a clutch actuating face, and the other side of the piston constituting a brake actuating face.

In this way, a single component has a dual function, which is advantageous in giving alternate engagement of clutch and brake, and thus enhanced safety.

In the preferred embodiment, the brake member comprises a brake disc engageable on one side by the clutch actuating member, and on the other side by a brake actuating member movable from an inactive to an active condition. The brake actuating member is preferably a piston actuated by fluid under pressure and surrounding said output shaft.

In the preferred embodiment the brake disc and brake piston are secured against rotation and mounted on axially extending supports of the casing of the auxiliary drive, said supports permitting the necessary relative axial movement.

Owing to the fact that the braking device is resiliently loaded in the releasing direction, the power-take-off shaft can be made to rotate freely without any additional control means.

Other advantageous features of the invention are described in the other claims.

The invention also comprises a method of operating the clutch and brake of an auxiliary drive as described herein and according operation logic of the control means outlined above.

BRIEF DESCRIPTION OF THE DRAWINGS

Other features of the invention will be apparent from the following description of a preferred embodiment shown by way of example in the accompanying drawings in which:

FIG. 1 is a side view of the auxiliary drive in section, and

FIG. 2 is a detail of the auxiliary drive of FIG. 1.

DETAILED DESCRIPTION

The auxiliary drive depicted in the drawings was designed for use on an agricultural tractor. Linked for drive purposes to the drive motor of the vehicle, not illustrated, is an input shaft 1, which is linked to the drive-end half 2 of a friction clutch 3 of the multiple-disc type so as to be integral therewith in rotation. The half 4 thereof at the output end is integral in rotation with an output shaft 8, mounted by means of anti-friction bearings 5, 6 in the auxiliary drive housing 7, at the left-hand end-region of which the drive-end clutch half 2 is mounted by means of an anti-friction bearing 9.

Located between a driven plate 11 and supported by means of a locking ring 12 and a clutch piston 13 at the output-end clutch-half 4 is a stack of discs 10, the individual discs of which are retained alternately at the drive-end and the output-end halves of the friction clutch 3 so as to be fixed in rotation but axially slidable. The output-end half 4 is mounted on the output shaft 8 so as to be integral in rotation and axially slidable between two end positions. The clutch piston 13 can be pushed towards the left-hand side as viewed in the drawing into an end position by pressurising a pressure chamber 14, formed in conjunction with a supporting disc 15 mounted on the output shaft 8 so as to be integral therewith in rotation but not axially slidable thereon. Hydraulic medium is delivered to the pressure chamber 14 via a bore 8a in the output shaft 8 and passages in the auxiliary drive housing 7 not illustrated. Whilst pressure is being applied, the clutch piston 13 moves against the force of a plate spring unit 16 supported on the output-end half 4 of the clutch, against the stack of discs 10 pushing it together in such a way that the desired torque is transmitted, thereby engaging the friction clutch 3.

In order to release the friction clutch 3, the pressure chamber 14 is depressurised via the bore 8a. The clutch piston 13 is therefore moved by the force of the plate-spring unit 16 in the direction of its right-hand end-position, until the region 19 thereof remote from the friction coupling 3 comes to a stop against a brake disc 18 of a braking device 17. The clutch piston 13 and brake region 19 therefore form a clutch-brake-piston unit 20. It should be noted that at the instant at which the brake region 19 comes to a stop against the brake disc 18, there is still a specific free path between the supporting disc 15 and the clutch piston 13 and the clutch-brake piston 20 has therefore not yet reached the end of its travel path as determined by its structural design at this point in time.

Apart from the brake disc 18 and the brake region 19 mentioned above, the braking device 17 has, on a shoulder 7a of the auxiliary drive housing 7, an axially slidable brake piston 21. Together with the shoulder 7a, this forms a pressure chamber 22, which can be pressurised by the hydraulic system of the vehicle via bores 7b in the auxiliary drive housing provided the drive motor of the vehicle, which also drives the pump of the hydraulic system is switched on. Once the drive motor is switched off and the pump is relieved of pressure, the pressure chamber 22 is also without pressure.

In order to guide the brake piston 21, a number of guide bushes 23 are arranged evenly distributed along a common circle segment and secured onto the housing 7 by means of screws 24. The guide bushes 23 have three steps on the exterior, ie regions of varying diameter, the steps being arranged so that the steps with the smallest diameter lie against the housing 7 and assume the function of guiding the brake piston 21. The length of this step is calibrated so that the brake piston 21 is in a position to perform a specific stroke. The adjoining second step of a larger diameter bears a return spring 25, lying against the third step of a still larger diameter and against the brake piston 21. The length of the stroke is calibrated so that in the stroke end-position illustrated, in which it lies against the second step of the guide bush 23, the brake piston projects into the travel path of the brake region 19 and the brake disk 18 and, in its other stroke end-position, in which it lies against the housing 7, it is moved fully back from the travel path of the brake region 19. Consequently, when the brake piston 21 is in its left-hand stroke end-position, the braking device 17 is engaged by means of the brake region 19 pushed to the right-hand side whereas this is not possible if the brake piston 21 is in its right-hand stroke-end position.

The brake piston 21 has a surface 21a facing the brake region 19, against which the brake region 19 bears when the braking device 17 is engaged on the brake piston 21. In order to increase the braking action and retain the brake region 19 and the brake piston 21 free of wear, a brake disc 18 is assigned to the brake region 19 and is located between these components. As can be seen from FIG. 2, the brake disc 18 is retained on the housing 7 so that it is fixed in rotation and axially slidable by means of guide sleeves 26, which are offset in the circumferential direction relative to the guide bushes 23. The guide sleeves 26 are secured in a manner similar to the guide bushes 23, by means of screws 27.

The output shaft 8 bears three gears 28, 29, 30 integral therewith in rotation, which are permanently meshed with three gears 35, 36, 37 rotatably mounted on a power-take-off shaft 34 by means of anti-friction bearings 31, 32, 33. One of these respective gears is joined to the power-take-off shaft 34 in rotation by means of switchgear, the switchgear being shown only by the operating sleeves 38, 39 providing the connection in rotation to the power-take-off shaft 34. The operating sleeve 38 can be moved into three different positions. A first, middle switching position of the operating sleeve 38 causes this gear system to be shifted into a neutral position, whilst in the left-hand end-position, the gear 35 and in the right-hand end-position the gear 36, is linked to the power-take-off shaft. When in the left-hand end-position, the gear 37 can be coupled with the power-take-off shaft 34 and in the illustrated right-hand end-position released therefrom by means of the operating sleeve 39.

The power-take-off shaft 34 is rotatably mounted in the housing 7 by means of anti-friction bearings 40, 41 and is detachably joined to a power-take-off stub 42, having splining 42a on the exterior, co-operating with a matching splining of the articulated shaft, not illustrated, of a work tool, also not illustrated.

The system operates in the following manner:

When the drive motor is switched off, the pressure chamber 14 is without pressure, so that the clutch piston 20 assumes its right-hand end-position limited by the supporting disc 15. At the same time, the pressure chamber behind the annular brake 21 is without pressure and therefore lies against the housing 7 biased by the force of the return springs 25 and is moved away from the travel path of the clutch piston 20. The braking system 17 therefore has no effect. This is of practical use since there are times when it is necessary to turn the power-take-off shaft 34 slightly when changing a work tool, so that the articulated shaft of the work tool can be pushed onto the power-take-off stub 42. For this reason, the work tool should be changed whilst the drive motor is switched off. The pressure chamber 22 is therefore without pressure and the braking device 17 without effect. The power-take-off stub 42 can be slightly turned manually.

When the drive motor is switched on and the pump starts to deliver to the hydraulic system of the vehicle, the pressure chamber 22 behind the brake piston 21 is pressurised. The brake piston 21 moves into its left-hand end-stroke position and pushes the clutch piston 20 against the force of the plate spring unit 16 a short distance back into the travel path of the brake region 19, so that the braking device 17 becomes effective and secures the power-take-off shaft 34 against rotation.

If power is required at the power-take-off shaft 34, the pressure chamber 14 will be pressurised and the clutch piston 20 will be pushed against the stack of discs 10 overcoming the force of the plate spring unit 16. This causes the braking device 17 to be released and the friction clutch 3 to be engaged. The drive link from the input shaft 1 is therefore established via the output shaft 8 and one of the gear stages 28, 35; 28, 36; 30, 37 to the power-take-off shaft 34. In order to interrupt the power flow, only pressure chamber 14 needs to be depressurised, in which case the clutch piston 20 will release the friction clutch 3 as it moves to the right and engage the braking device 17.

What is claimed is:

1. An auxiliary drive for a vehicle comprising:
   an input shaft;
   an output shaft;
   a clutch selectively engageable to couple said input shaft and said output shaft;
   a clutch actuating member fixed for rotation with said output shaft and movable in a first direction to engage said clutch and in a second direction to disengage said clutch; and
   a brake selectively engageable with said output shaft, whereby said clutch and said brake can be alternately engaged to respectively drive and brake said output shaft, wherein said brake is constituted by movement of said clutch actuating member in the second direction to engage a brake member, and said brake member includes a control apparatus selectively operable to place said brake member in an active or an inactive condition whereby said brake is rendered effective or ineffective, wherein said control apparatus includes a fluid pressure operated brake piston, said brake piston is retained against rotation with said output shaft, and said brake piston is guided on a plurality of guide bushes evenly distributed about the circumference of a circle and secured onto a housing of the auxiliary drive, an external diameter of said guide bushes having three steps, whereby: (a) said steps having the smallest diameter are adjacent to the auxiliary drive housing and form a guide for said brake piston; (b) said steps having the medium diameter form a stop limiting the travel path of said brake piston in the direction of said clutch and accommodate return springs for said brake piston, and (c) said steps having the largest diameter form a stop for said return springs.

2. The auxiliary drive defined in claim 1 wherein said clutch actuating member is resiliently biased in the second direction against a stop.

3. The auxiliary drive defined in claim 1 wherein said clutch actuating member is a fluid pressure operated clutch piston.

4. The auxiliary drive defined in claim 1 wherein said brake piston is resiliently biased to the inactive condition.

5. The auxiliary drive defined in claim 1 wherein when the brake is engaged, said brake piston is supported on a component rotatable with said output shaft and on part of a housing for the auxiliary drive.

6. The auxiliary-drive defined in claim 1 wherein said brake member includes a brake disc that is secured against rotation with said output shaft and is displaceable in said first direction to the active condition by said control apparatus.

7. The auxiliary drive defined in claim 1 wherein said guide bushes are secured onto the auxiliary drive housing by means of screws.

8. An auxiliary drive for a vehicle comprising:
   an input shaft;
   an output shaft;
   a clutch selectively engageable to couple said input shaft and said output shaft;
   a clutch actuating member fixed for rotation with said output shaft and movable in a first direction to engage said clutch and in a second direction to disengage said clutch; and
   a brake selectively engageable with said output shaft, whereby said clutch and brake can be alternately engaged to respectively drive and brake said output shaft, wherein said brake is constituted by movement of said clutch actuating member in the second direction to engage a brake member, and said brake member includes a control apparatus selectively operable to place said brake member in an active or an inactive condition whereby said brake is rendered effective or ineffective, wherein said brake member includes a brake disc that is secured against rotation with said output shaft and is displaceable in said first direction to the active condition by said control apparatus.

9. The auxiliary drive defined in claim 8 wherein said control apparatus includes a fluid pressure operated brake piston.

10. The auxiliary drive defined in claim 9 wherein said brake piston is retained against rotation with said output shaft, and said brake piston is guided on a plurality of guide bushes evenly distributed about the circumference of a circle and secured onto a housing of the auxiliary drive.

11. The auxiliary drive defined in claim 10 wherein an external diameter of said guide bushes has three steps, whereby: (a) said steps having the smallest diameter are adjacent to the auxiliary drive housing and form a guide for said brake piston; (b) said steps having the medium diameter form a stop limiting the travel path of said brake piston in the direction of said clutch and accommodate return springs for said brake piston, and (c) said steps having the largest diameter form a stop for said return springs.

12. The auxiliary drive defined in claim 8 wherein said clutch actuating member is resiliently biased in the second direction against a stop.

13. The auxiliary drive defined in claim 8 wherein said clutch actuating member is a fluid pressure operated clutch piston.

14. The auxiliary drive defined in claim 8 wherein said brake piston is resiliently biased to the inactive condition.

15. The auxiliary drive defined in claim 8 wherein when the brake is engaged, said brake piston is supported on a component rotatable with said output shaft and on part of a housing for the auxiliary drive.

16. The auxiliary drive defined in claim 8 wherein said brake member includes a brake disc that is secured against rotation with said output shaft and is displaceable in said first direction to the active condition by said control apparatus.

17. The auxiliary drive defined in claim 8 wherein said guide bushes are secured onto the auxiliary drive housing by means of screws.

* * * * *